US012669724B2

(12) United States Patent
Liang et al.

(10) Patent No.: US 12,669,724 B2
(45) Date of Patent: Jun. 30, 2026

(54) FOLDED ELECTRO-OPTIC MODULATOR

(71) Applicant: NANJING LYCORE TECHNOLOGIES CO., LTD., Nanjing (CN)

(72) Inventors: Hanxiao Liang, Nanjing (CN); Yipin Song, Nanjing (CN); Yingcong Zhou, Nanjing (CN); Haicang Wu, Nanjing (CN); Wenhao Mao, Nanjing (CN); Shiwei Song, Nanjing (CN); Weiqi Sun, Nanjing (CN); Qingyang Yu, Nanjing (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 374 days.

(21) Appl. No.: 18/684,001

(22) PCT Filed: Jun. 9, 2022

(86) PCT No.: PCT/CN2022/097963
§ 371 (c)(1),
(2) Date: Feb. 15, 2024

(87) PCT Pub. No.: WO2023/020082
PCT Pub. Date: Feb. 23, 2023

(65) Prior Publication Data
US 2024/0361625 A1 Oct. 31, 2024

(30) Foreign Application Priority Data
Aug. 19, 2021 (CN) .......................... 202110955347.1

(51) Int. Cl.
*G02F 1/35* (2006.01)
*G02F 1/03* (2006.01)
(Continued)

(52) U.S. Cl.
CPC .......... *G02F 1/0356* (2013.01); *G02F 1/2255* (2013.01); *G02F 2201/063* (2013.01); *G02F 2201/122* (2013.01)

(58) Field of Classification Search
CPC ........ G02F 1/0356; G02F 1/2255; G02F 1/03; G02F 1/212; G02F 1/225; G02F 1/0316;
(Continued)

(56) References Cited

U.S. PATENT DOCUMENTS 5,675,673 A 10/1997 Skeie
6,310,700 B1 * 10/2001 Betts ..................... G02F 1/2255
359/2
(Continued)

FOREIGN PATENT DOCUMENTS

CN 110441928 11/2019
CN 110609399 12/2019
(Continued)

OTHER PUBLICATIONS

Office Action in Japanese Appln. No. 2024-509494, mailed on Jan. 7, 2025, 11 pages (with English translation).
(Continued)

*Primary Examiner* — Thomas A Hollweg
*Assistant Examiner* — Erin D Chiem
(74) *Attorney, Agent, or Firm* — Fish & Richardson P.C.

(57) ABSTRACT

A folded electro-optic modulator is provided. The folded electro-optic modulator includes: a first main electrode, a first waveguide arm, a second main electrode, a second waveguide arm and a third main electrode arranged in sequence, and the following structures provided in each even-ordered radio-frequency modulation region of the folded electro-optic modulator: a plurality of first sub-
(Continued)

electrodes; a plurality of second sub-electrodes; a plurality of third sub-electrodes; and a plurality of fourth sub-electrodes.

10 Claims, 10 Drawing Sheets

(51) Int. Cl.
    *G02F 1/035*         (2006.01)
    *G02F 1/225*         (2006.01)

(58) Field of Classification Search
    CPC ............. G02F 1/0147; G02F 2201/063; G02F 2201/122; G02F 2201/18; G02F 2002/20; G02B 2006/12142; G02B 2006/1204; G02B 2006/12045
    See application file for complete search history.

(56)               References Cited

U.S. PATENT DOCUMENTS

| | | | | |
|---|---|---|---|---|
| 7,382,943 | B1 * | 6/2008 | Heaton | G02F 1/2255 385/40 |
| 7,801,400 | B2 * | 9/2010 | Sugiyama | G02B 6/1342 385/32 |
| 9,746,743 | B1 | 8/2017 | Rabiei | |
| 2011/0158576 | A1 * | 6/2011 | Kissa | G02F 1/225 385/2 |
| 2013/0170781 | A1 * | 7/2013 | Kissa | G02F 1/0316 385/3 |
| 2018/0039151 | A1 * | 2/2018 | Doerr | H04B 10/516 |
| 2019/0271896 | A1 * | 9/2019 | Sugiyama | G02F 1/218 |
| 2020/0272021 | A1 * | 8/2020 | Hara | G02F 1/0356 |
| 2021/0080796 | A1 * | 3/2021 | Kissa | G02F 1/0356 |
| 2021/0157177 | A1 | 5/2021 | Kharel et al. | |
| 2021/0278597 | A1 * | 9/2021 | Sugiyama | G02F 1/212 |
| 2021/0311336 | A1 * | 10/2021 | Kharel | G02F 1/0356 |
| 2023/0400718 | A1 * | 12/2023 | Takano | G02F 1/035 |
| 2025/0068001 | A1 * | 2/2025 | Chang | G02B 6/2804 |

FOREIGN PATENT DOCUMENTS

| | | |
|---|---|---|
| CN | 110824731 | 2/2020 |
| CN | 111505845 A | 8/2020 |
| CN | 112748589 | 5/2021 |
| CN | 112904599 | 6/2021 |
| JP | 2005-506554 A | 3/2005 |
| JP | 2008-171005 A | 7/2008 |

OTHER PUBLICATIONS

Extended European Search Report in European Appln. No. 22857396. 0, mailed on Nov. 11, 2024, 10 pages.

* cited by examiner

FOLDED ELECTRO-OPTIC MODULATOR

CROSS-REFERENCE TO RELATED APPLICATION

The present application is a national stage filing under 35 U.S.C. § 371 of International Application No. PCT/CN2022/097963, filed on Jun. 9, 2022, which claims priority to Chinese Patent Application No. 202110955347.1, filed on Aug. 19, 2021. The contents of these applications are incorporated herein by reference in their entirety.

TECHNICAL FIELD

The present disclosure relates to the technical field of optical communications, and in particular, to a folded electro-optic modulator.

BACKGROUND

In recent years, with rapid development of emerging network application services such as Internet of Things, driverless, telemedicine, and distance education, higher requirements have been put forward for high-speed and large-capacity communication technology. Optical communications have achieved rapid development in the direction of high-speed and large-capacity communications due to their characteristics such as a large bandwidth, high reliability, a low cost and a strong anti-interference ability. How to load high-speed electrical signals onto optical carriers is a core research content.

An electro-optic modulator is a modulator that is made based on an electro-optic effect of electro-optic materials. The electro-optic effect means that when a voltage is applied to an electro-optic material such as a lithium niobate crystal, a gallium arsenide crystal, or a lithium tantalate crystal, a refractive index of the electro-optic material will vary, resulting in a change in characteristics of light waves passing through the electro-optic material. The use of the electro-optic effect allows modulation of parameters, such as the phase, amplitude, intensity and polarization state, of optical signals.

With increasingly urgent requirements for the high-speed and large-capacity communication technology, higher requirements have been put forward for the performance of device and the size of device of the electro-optic modulator.

SUMMARY

Embodiments of the present disclosure provide a folded electro-optic modulator, comprising: a first waveguide arm and a second waveguide arm, which are in a folded form as a whole and do not intersect with each other; a first main electrode, a second main electrode and a third main electrode, which are in a folded form as a whole and do not intersect with each other, the first waveguide arm being located between the first main electrode and the second main electrode, the second waveguide arm being located between the second main electrode and the third main electrode, the first main electrode and the third main electrode being ground electrodes for radio-frequency signals, and the second main electrode being a signal electrode for the radio-frequency signals; and the following structures provided in any even-ordered radio-frequency modulation region of the folded electro-optic modulator in a transmission direction of the first waveguide arm and the second waveguide arm:

a plurality of first sub-electrodes, each of which is connected to a side of the first main electrode close to the second main electrode by means of a first connecting arm that is insulated from and intersects with the first waveguide arm; a plurality of second sub-electrodes, each of which is connected to a side of the second main electrode close to the first main electrode by means of a second connecting arm that is insulated from and intersects with the first waveguide arm; a plurality of third sub-electrodes, each of which is connected to a side of the second main electrode close to the third main electrode by means of a third connecting arm that is insulated from and intersects with the second waveguide arm; and a plurality of fourth sub-electrodes, each of which is connected to a side of the third main electrode close to the second main electrode by means of a fourth connecting arm that is insulated from and intersects with the second waveguide arm.

In some embodiments, each of the first sub-electrodes and the corresponding first connecting arm form a first T-shaped structure, each of the second sub-electrodes and the corresponding second connecting arm form a second T-shaped structure, and the plurality of first T-shaped structures and the plurality of second T-shaped structures are alternately arranged in an extension direction of the radio-frequency modulation region, with a gap between the adjacent first sub-electrodes being smaller than the length of the second sub-electrode, and a gap between the adjacent second sub-electrodes being smaller than the length of the first sub-electrode; and each of the third sub-electrodes and the corresponding third connecting arm form a third T-shaped structure, each of the fourth sub-electrodes and the corresponding fourth connecting arm form a fourth T-shaped structure, and the plurality of third T-shaped structures and the plurality of fourth T-shaped structures are alternately arranged in the extension direction of the radio-frequency modulation region, with a gap between the adjacent third sub-electrodes being smaller than the length of the fourth sub-electrode, and a gap between the adjacent fourth sub-electrodes being smaller than the length of the third sub-electrode.

In some embodiments, each of the first sub-electrodes and the corresponding first connecting arm form a first L-shaped structure, each of the second sub-electrodes and the corresponding second connecting arm form a second L-shaped structure, and the plurality of first L-shaped structures and the plurality of second L-shaped structures are alternately arranged in the extension direction of the radio-frequency modulation region, with an orthographic projection of each of the first sub-electrodes overlapping with an orthographic projection of one second sub-electrode in the extension direction of the radio-frequency modulation region; and each of the third sub-electrodes and the corresponding third connecting arm form a third L-shaped structure, each of the fourth sub-electrodes and the corresponding fourth connecting arm form a fourth L-shaped structure, and the plurality of third L-shaped structures and the plurality of fourth L-shaped structures are alternately arranged in the extension direction of the radio-frequency modulation region, with an orthographic projection of each of the third sub-electrodes overlapping with an orthographic projection of one fourth sub-electrode in the extension direction of the radio-frequency modulation region.

In some embodiments, the folded electro-optic modulator comprises a substrate, an isolation layer, a waveguide layer, an insulation layer and an electrode layer arranged in sequence, wherein the first waveguide arm and the second waveguide arm are located in the waveguide layer; the first main electrode, the second main electrode, the third main electrode, the first sub-electrodes, the first connecting arms, the second sub-electrodes, the second connecting arms, the third sub-electrodes, the third connecting arms, the fourth sub-electrodes and the fourth connecting arms are located in the electrode layer; and the first connecting arms and the second connecting arms are insulated from the first waveguide arm by means of the insulation layer, and the third connecting arms and the fourth connecting arms are insulated from the second waveguide arm by means of the insulation layer.

In some embodiments, the waveguide layer is a ridge raised pattern layer; or the waveguide layer is a ridge waveguide layer comprising a flat plate layer and a ridge raised pattern layer located on a side of the flat plate layer away from the substrate, and the first waveguide arm and the second waveguide arm are located in the ridge raised pattern layer.

In some embodiments, the waveguide layer is a ridge waveguide layer comprising a flat plate layer and a ridge raised pattern layer located on a side of the flat plate layer away from the substrate, and the first waveguide arm and the second waveguide arm are located in the ridge raised pattern layer; and the insulation layer covers the ridge raised pattern layer and exposes at least a part of region of the flat plate layer, and the first main electrode, the second main electrode and the third main electrode are formed on a surface of the flat plate layer exposed from the insulation layer; or the insulation layer covers the ridge raised pattern layer and covers at least a part of region of the flat plate layer, and the first main electrode, the second main electrode and the third main electrode are formed on a surface of the portion of the insulation layer that covers the flat plate layer.

In some embodiments, a protruding structure formed by a portion of the insulation layer that covers the first waveguide arm is located between the first sub-electrodes and the first main electrode and between the second sub-electrodes and the second main electrode; and a protruding structure formed by a portion of the insulation layer that covers the second waveguide arm is located between the third sub-electrodes and the second main electrode and between the fourth sub-electrodes and the third main electrode.

In some embodiments, the first sub-electrodes and the second sub-electrodes are formed on a surface of the protruding structure formed by the portion of the insulation layer that covers the first waveguide arm; and the third sub-electrodes and the fourth sub-electrodes are formed on a surface of the protruding structure formed by the portion of the insulation layer that covers the second waveguide arm.

In some embodiments, the folded electro-optic modulator further comprises at least one of the following structures provided in at least one odd-ordered radio-frequency modulation region of the folded electro-optic modulator: a plurality of fifth sub-electrodes, each of which is located between the first main electrode and the first waveguide arm and is connected to a side of the first main electrode close to the first waveguide arm by means of a fifth connecting arm; a plurality of sixth sub-electrodes, each of which is located between the second main electrode and the first waveguide arm and is connected to a side of the second main electrode close to the first waveguide arm by means of a sixth connecting arm; a plurality of seventh sub-electrodes, each of which is located between the second main electrode and the second waveguide arm and is connected to a side of the second main electrode close to the second waveguide arm by means of a seventh connecting arm; and a plurality of eighth sub-electrodes, each of which is located between the third main electrode and the second waveguide arm and is connected to a side of the third main electrode close to the second waveguide arm by means of an eighth connecting arm.

In some embodiments, the substrate is provided with a recess structure.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

More details, features, and advantages of the present disclosure are disclosed in the following description of example embodiments with reference to the accompany drawings, in which.

DETAILED DESCRIPTION OF EMBODIMENTS

Only some example embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

A Mach-Zehnder modulator is one type of electro-optic modulator, in which an input optical signal is split into two branch optical signals, which then enter two waveguide arms, respectively. The two waveguide arms are each made of an electro-optic material and have a refractive index changing with an applied modulation voltage. The change in the refractive index of the waveguide arms may lead to a change in phases of the branch optical signals. Therefore, an output from the convergence of the two branch optical signals is an interference signal with an intensity changing with the modulation voltage. In brief, the Mach-Zehnder modulator can implement modulation of different sidebands by controlling the modulation voltage applied to the two waveguide arms. As a device for converting electrical signals into optical signals, the Mach-Zehnder modulator is one of the common core devices in optical interconnection, optical computing and optical communication systems.

Figure 1:
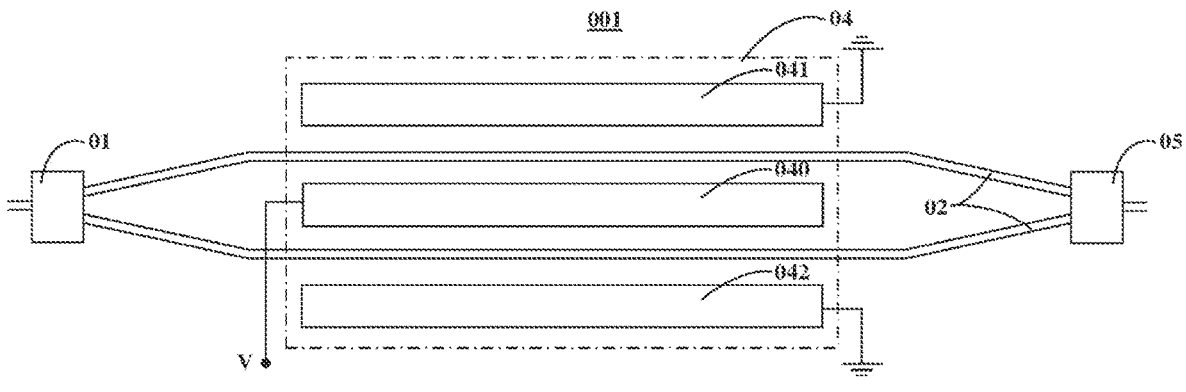
FIG. 1 is a top view of a simplified structure of a conventional electro-optic modulator.

FIG. 1 shows a schematic structural view of a conventional Mach-Zehnder modulator. Ideally, the Mach-Zehnder modulator 001 has two waveguide arms 02 that are identical to each other. When the Mach-Zehnder modulator 001 is not working, neither of the two waveguide arms 02 undergoes an electro-optic effect. Input light passes through an optical-splitting element 01 and is then equally split into two branch optical signals. The two branch optical signals are still in the same phase after respectively passing through the waveguide arms 02, and then a coherently enhanced signal for the two branch optical signals will be output from an optical-combining element 05. When the Mach-Zehnder modulator 001 is working, a modulation electrode 04 (for example, including a signal electrode 040, a first ground electrode 041 and a second ground electrode 042) applies a modulation voltage to the two waveguide arms 02, and the two branch optical signals may differ in phase by an odd or even multiple of π after each of the two branch optical signals passes through one waveguide arm 02. When the two branch optical signals differ in phase by an even multiple of π, the optical-combining element 05 outputs a coherently enhanced signal for the two branch optical signals. When the two branch optical signals differ in phase by an odd multiple of π, the optical-combining element 05 outputs a coherently suppressed signal for the two branch optical signals.

As can be seen from the figure, such a conventional Mach-Zehnder modulator has a structural feature of being elongated, with a length usually on the order of millimeters or centimeters and a width usually on the order of hundreds of micrometers. In addition, in order to minimize a drive voltage, consideration will also be given to increasing the length of the two waveguide arms. Although the Mach-Zehnder modulator has a small width dimension, its overall size is still mainly determined by the length dimension. Therefore, how to realize the miniaturization design of device without affecting the performance of device is a technical problem to be solved urgently by those skilled in the art.

The embodiments of the present disclosure provide a folded electro-optic modulator, which can realize the miniaturization design of device while meeting the requirements for the performance of device.

Figure 2:
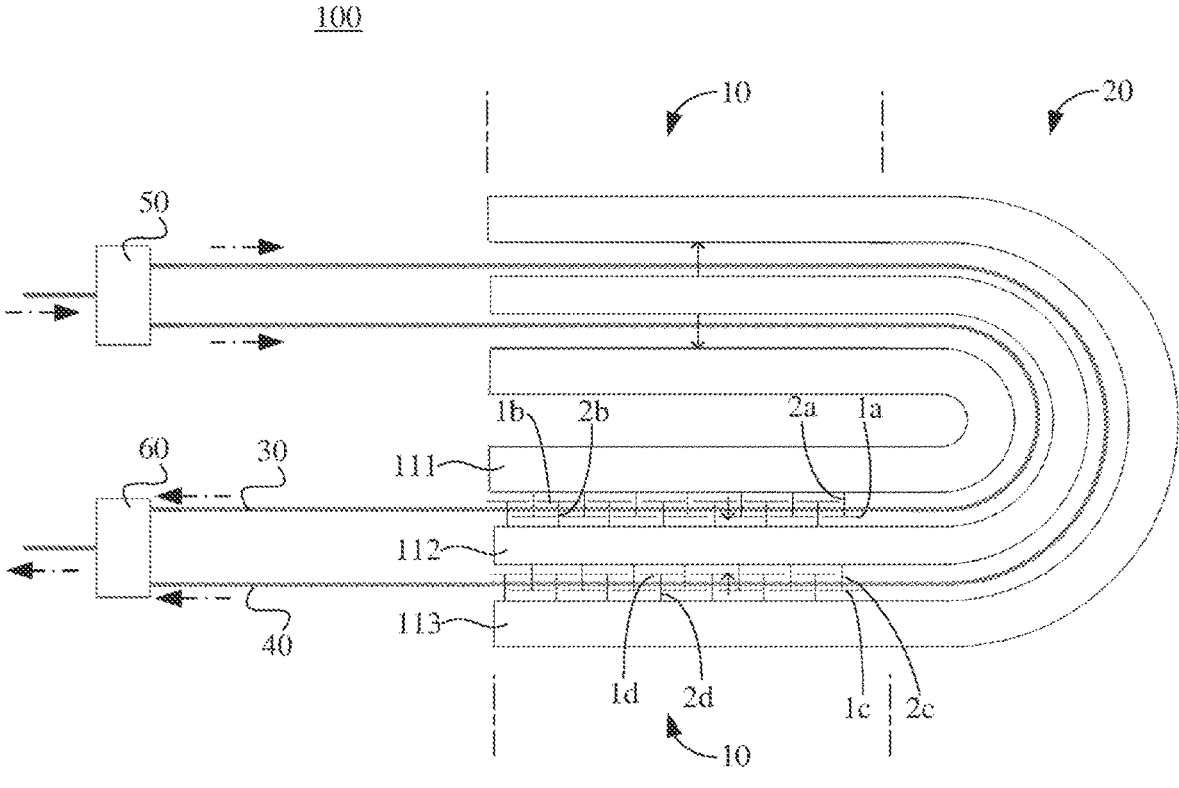
FIG. 2 is a top view of a simplified structure of a folded electro-optic modulator according to some example embodiments of the present disclosure.

As shown in FIG. 2, some embodiments of the present disclosure provide a folded electro-optic modulator 100 including N radio-frequency modulation regions 10 and N−1 turn regions 20, where N≥2. The folded electro-optic modulator 100 includes: a first waveguide arm 30 and a second waveguide arm 40, which are in a folded form as a whole and do not intersect with each other; a first main electrode 111, a second main electrode 112 and a third main electrode 113, which are in a folded form as a whole and do not intersect with each other, the first waveguide arm 30 being located between the first main electrode 111 and the second main electrode 112, the second waveguide arm 40 being located between the second main electrode 112 and the third main electrode 113, the first main electrode 111 and the third main electrode 113 being ground electrodes for radio-frequency signals, and the second main electrode 112 being a signal electrode for the radio-frequency signals; In addition, the folded electro-optic modulator 100 further includes a plurality of first sub-electrodes 1a, a plurality of second sub-electrodes 1b, a plurality of third sub-electrodes 1c and a plurality of fourth sub-electrodes 1d, which are arranged in any even-ordered radio-frequency modulation region 10 in a transmission direction of the first waveguide arm 30 and the second waveguide arm 40 (indicated by the arrows with dash-dotted line in the figure). The radio-frequency modulation regions 10 are sequentially arranged in the transmission direction of the first waveguide arm 30 and the second waveguide arm 40.

As shown in FIG. 2, each first sub-electrode 1a is connected to a side of the first main electrode 111 close to the second main electrode 112 by means of a first connecting arm 2a that is insulated from and intersects with the first waveguide arm 30, each second sub-electrode 1b is connected to a side of the second main electrode 112 close to the first main electrode 111 by means of a second connecting arm 2b that is insulated from and intersects with the first waveguide arm 30, each third sub-electrode 1c is connected to a side of the second main electrode 112 close to the third main electrode 113 by means of a third connecting arm 2c that is insulated from and intersects with the second waveguide arm 40, and each fourth sub-electrode 1d is connected to a side of the third main electrode 113 close to the second main electrode 112 by means of a fourth connecting arm 2d that is insulated from and intersects with the second waveguide arm 40.

In an embodiment of the present disclosure, in order to achieve the input and output of optical signals, the folded electro-optic modulator 100 further includes an input element (e.g., an optical-splitting element 50) and an output element (e.g., an optical-combining element 60). In this embodiment, the optical-splitting element 50 serves as the input element of the folded electro-optic modulator 100 and includes one input end and two output ends, the optical-combining element 60 serves as the output element of the folded electro-optic modulator 100 and includes two input ends and one output end, the first waveguide arm 30 is connected to one of the output ends of the optical-splitting element 50 and one of the input ends of the optical-combining element 60, and the second waveguide arm 40 is connected to the other output end of the optical-splitting element 50 and the other input end of the optical-combining element 60. The structures of the input element and the output element are not limited to a three-port element shown in the figure, and the design can be selected according to the actual needs of the folded electro-optic modulator 100.

In an embodiment of the present disclosure, N is a natural number, and N≥2. It should be understood that when there are even number of radio-frequency modulation regions 10 (e.g., when N=2 as shown in FIG. 2), the optical-splitting element 50 and the optical-combining element 60 are arranged on the same side of the folded electro-optic modulator; and when there are odd number of radio-frequency modulation regions, the optical-splitting element and the optical-combining element are arranged on the opposite sides of the folded electro-optic modulator.

The first waveguide arm 30 and the second waveguide arm 40 are made of an electro-optic material, such as lithium niobate, lithium tantalate or potassium titanyl phosphate. When a radio-frequency signal is input to the first main electrode 111, the second main electrode 112 and the third main electrode 113, in each radio-frequency modulation region 10, the first waveguide arm 30 is in an electric field formed by the plurality of first sub-electrodes 1a and the plurality of second sub-electrodes 1b, and the second waveguide arm 40 is in an electric field formed by the plurality of third sub-electrodes 1c and the plurality of fourth sub-electrodes 1d, the directions of the electric fields being respectively indicated by the arrows with dash-dotted line shown in the figure.

Since the refractive index changes of the electro-optic material are associated with the direction of the electric field, if the direction of the electric field in the even-ordered radio-frequency modulation region is not reversed, the direction of the electric field in the even-ordered radio-frequency modulation region is just opposite to the direction of the electric field in the odd-ordered radio-frequency modulation region. In this way, a phase difference generated by the two waveguide arms in the odd-ordered radio-frequency modulation region will be canceled out in the next even-ordered radio-frequency modulation region, making it impossible to achieve the optical modulation function.

In view of the above problem, the embodiments of the present disclosure design the structure of sub-electrodes and connecting arms described above. As shown in FIG. 2, the electric field formed by the plurality of first sub-electrodes 1a and the plurality of second sub-electrodes 1b and the electric field formed by the plurality of third sub-electrodes 1c and the plurality of fourth sub-electrodes 1d are respectively shown by the arrows with dash-dotted line in the figure. It can be seen that the electric fields in which the first waveguide arm 30 is located in the first radio-frequency modulation region (i.e., the radio-frequency modulation region 10 at the top in the figure) and in the second radio-frequency modulation region (i.e., the radio-frequency modulation region 10 at the bottom in the figure) have the same direction, and the electric fields in which the second waveguide arm 40 in the first radio-frequency modulation region and in the second radio-frequency modulation region have the same direction.

The folded electro-optic modulator 100 provided in the embodiments of the present disclosure is of the folded design, and accordingly has a greatly reduced dimension in the lengthwise direction as compared to the conventional electro-optic modulator. In order to obtain better performance of device, the length of the waveguide arm can be designed to increase as required, and the overall length of device is less affected.

In addition, compared to some designs in the art of using insulation and intersection and achieving bridging through vias, the first waveguide arm 30, the second waveguide arm 40, the first main electrode 111, the second main electrode 112 and the third main electrode 113 all have a design without intersection, achieving a simpler structural design and relatively low requirements for the control of manufacturing precision, which is conducive to the improvement of the production efficiency and product yield and the reduction of production costs.

As shown in FIG. 2, in some embodiments of the present disclosure, each first sub-electrode 1a and the corresponding first connecting arm 2a form a first T-shaped structure, each second sub-electrode 1b and the corresponding second connecting arm 2b form a second T-shaped structure, and the plurality of first T-shaped structures and the plurality of second T-shaped structures being alternately arranged in an extension direction of the radio-frequency modulation region 10 (i.e., the extension direction of the two waveguide arms in the radio-frequency modulation region 10), with a gap between the adjacent first sub-electrodes 1a being smaller than the length of the second sub-electrode 1b, and a gap between the adjacent second sub-electrodes 1b being smaller than the length of the first sub-electrode 1a. The portions of the plurality of first sub-electrodes 1a and the plurality of second sub-electrodes 1b opposite to each other may form an electric field, so that phase modulation for the light transmitted in the first waveguide arm 30 can be performed.

Similarly, each third sub-electrode 1c and the corresponding third connecting arm 2c form a third T-shaped structure, each fourth sub-electrode 1d and the corresponding fourth connecting arm 2d form a fourth T-shaped structure, and the plurality of third T-shaped structures and the plurality of fourth T-shaped structures are alternately arranged in the extension direction of the radio-frequency modulation region 10, with a gap between the adjacent third sub-electrodes 1c being smaller than the length of the fourth sub-electrode 1d, and a gap between the adjacent fourth sub-electrodes 1d being smaller than the length of the third sub-electrode 1c. The portions of the plurality of third sub-electrodes 1c and the plurality of fourth sub-electrodes 1d opposite to each other may form an electric field, so that phase modulation for the light transmitted in the second waveguide arm 40 can be performed.

Figure 3:
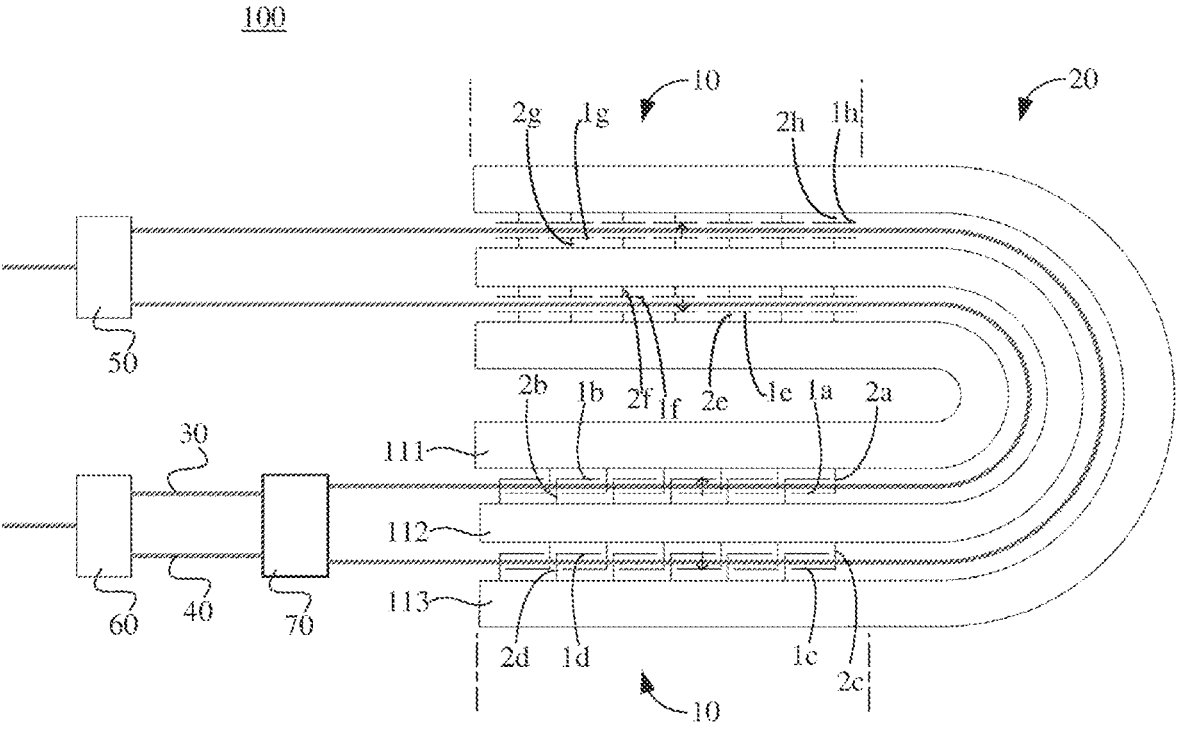
FIG. 3 is a top view of a simplified structure of a folded electro-optic modulator according to some example embodiments of the present disclosure.

As shown in FIG. 3, in some other embodiments of the present disclosure, each first sub-electrode 1a and the corresponding first connecting arm 2a form a first L-shaped structure, each second sub-electrode 1b and the corresponding second connecting arm 2b form a second L-shaped structure, and the plurality of first L-shaped structures and the plurality of second L-shaped structures are alternately arranged in an extension direction of the radio-frequency modulation region 10, with an orthographic projection of each first sub-electrode 1a overlapping with an orthographic projection of one second sub-electrode 1b in the extension direction of the radio-frequency modulation region 10. The portions of the plurality of first sub-electrodes 1a and the plurality of second sub-electrodes 1b opposite to each other may form an electric field, so that phase modulation for the light transmitted in the first waveguide arm 30 can be performed.

Similarly, each third sub-electrode 1c and a corresponding third connecting arm 2c form a third L-shaped structure, each of the fourth sub-electrodes 1d and the corresponding fourth connecting arm 2d form a fourth L-shaped structure, and the plurality of third L-shaped structures and the plurality of fourth L-shaped structures are alternately arranged in the extension direction of the radio-frequency modulation region 10, with an orthographic projection of each third sub-electrode 1c overlapping with an orthographic projection of one fourth sub-electrode 1d in the extension direction of the radio-frequency modulation region 10. The portions of the plurality of third sub-electrodes 1c and the plurality of fourth sub-electrodes 1d opposite to each other may form an electric field, so that phase modulation for the light transmitted in the second waveguide arm 40 can be performed.

The overall structure of sub-electrodes and the connecting arms described above may have a symmetrical or asymmetrical shape. The specific shapes of the sub-electrodes and the connecting arms are not defined in the present disclosure and not limited to the foregoing embodiments.

Figure 4:
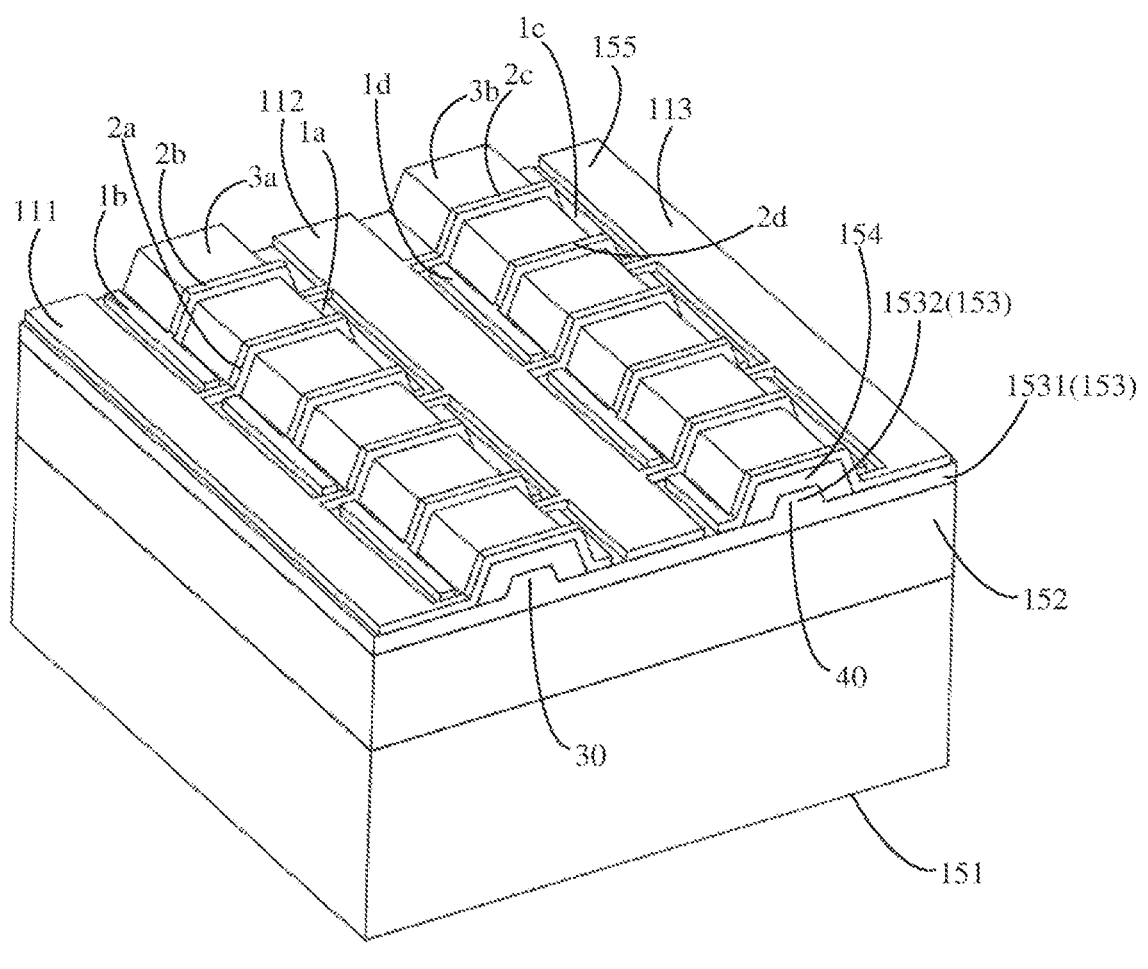
FIG. 4 is a perspective view of a partial structure of a folded electro-optic modulator according to some example embodiments of the present disclosure.

In an embodiment of the present disclosure, as shown in FIG. 4, layer structures of the folded electro-optic modulator include a substrate 151, an isolation layer 152, a waveguide layer 153, an insulation layer 154 and an electrode layer 155 arranged in sequence, wherein the first waveguide arm 30 and the second waveguide arm 40 are located in the waveguide layer 153; the first main electrode 111, the second main electrode 112, the third main electrode 113, the first sub-electrodes 1a, the first connecting arms 2a, the second sub-electrodes 1b, the second connecting arms 2b, the third sub-electrodes 1c, the third connecting arms 2c, the fourth sub-electrodes 1d and the fourth connecting arms 2d are located in the electrode layer 155; the first connecting arms 2a and the second connecting arms 2b are insulated from the first waveguide arm 30 by means of the insulation layer 154, and the third connecting arms 2c and the fourth connecting arms 2d are insulated from the second waveguide arm 40 by means of the insulation layer 154. Some layer structures of the folded electro-optic modulator may be fabricated by means of a mask patterning process, and the specific materials for making the layers are not limited and can be selected according to actual needs.

As shown in FIG. 4, in some embodiments of the present disclosure, the waveguide layer 153 is a ridge waveguide layer including a flat plate layer 1531 and a ridge raised pattern layer 1532 located on a side of the flat plate layer 1531 away from the substrate 151, and the first waveguide arm 30 and the second waveguide arm 40 are located in the ridge raised pattern layer 1532. In some other embodiments of the present disclosure, the waveguide layer 153 may include only the ridge raised pattern layer 1532 without the flat plate layer 1531, and the first waveguide arm 30 and the second waveguide arm 40 are at least a part of the ridge raised pattern layer 1532.

As shown in FIGS. 4, 5, 6 and 7, in this embodiment, the insulation layer 154 covers the ridge raised pattern layer 1532 and exposes at least a part of region of the flat plate layer 1531, and the first main electrode 111, the second main electrode 112 and the third main electrode 113 are formed on the surface of the flat plate layer 1531 exposed from the insulation layer 154.

Figure 8:
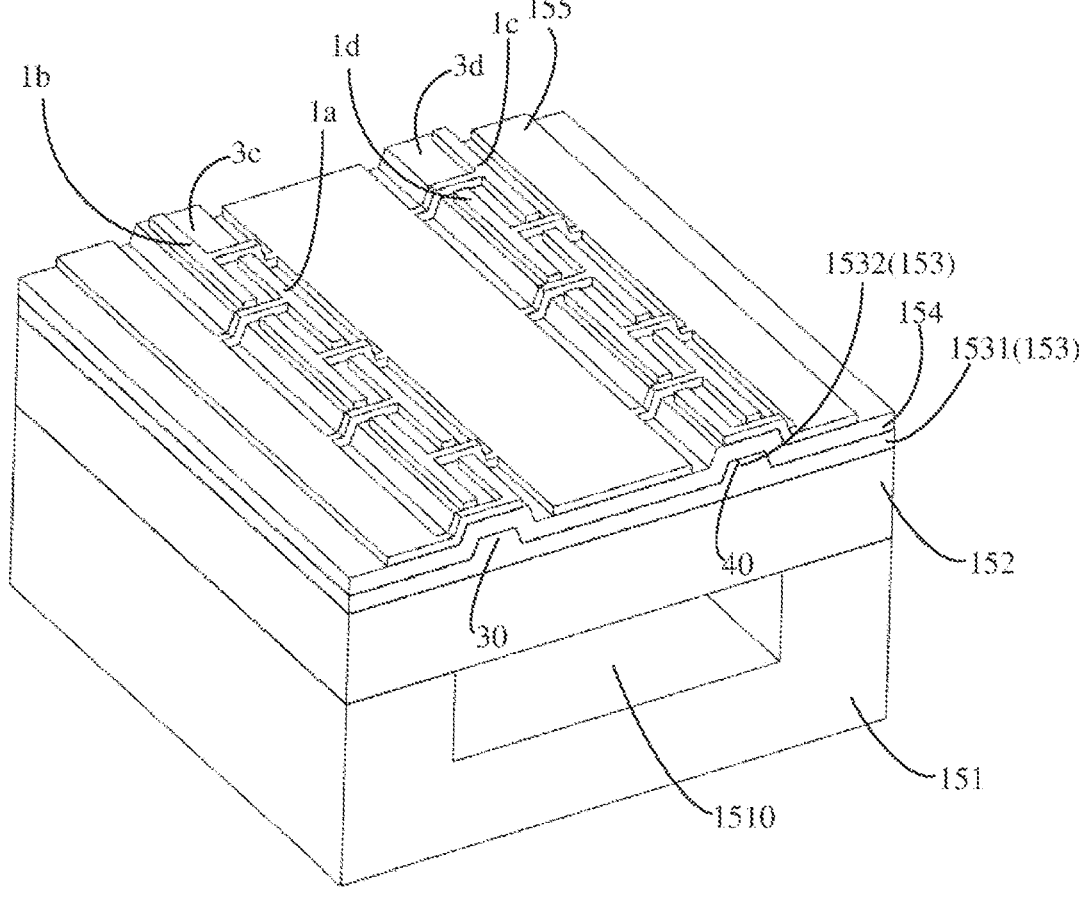
FIG. 8 is a perspective view of a partial structure of a folded electro-optic modulator according to some example embodiments of the present disclosure.
Figure 9:
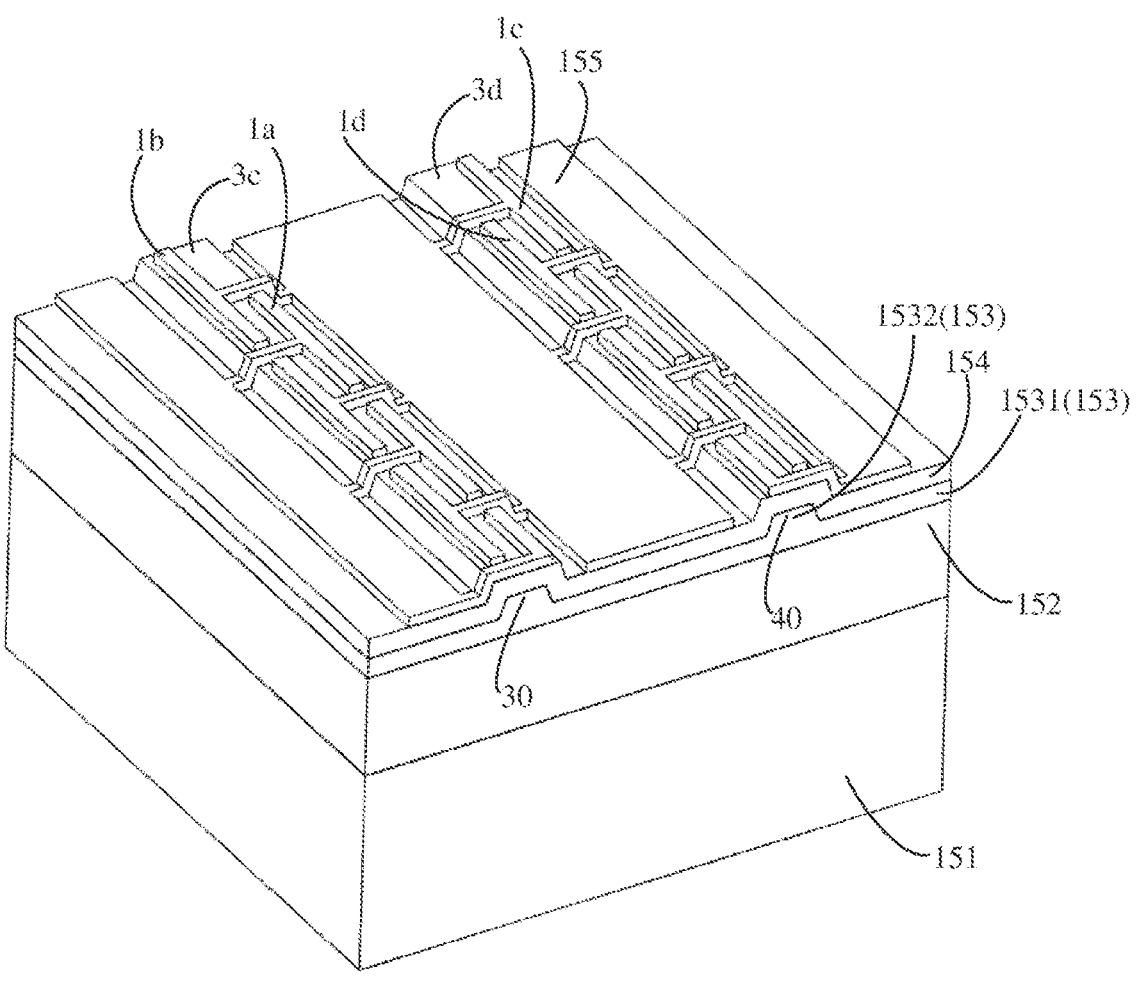
FIG. 9 is a perspective view of a partial structure of a folded electro-optic modulator according to some example embodiments of the present disclosure.

As shown in FIGS. 8 and 9, in some other embodiments of the present disclosure, the insulation layer 154 covers the ridge raised pattern layer 1532 and covers at least a part of region of the flat plate layer 1531, and the first main electrode 111, the second main electrode 112, and the third main electrode 113 are formed on the surface of a portion of the insulation layer 154 that covers the flat plate layer 1531. In this embodiment, the insulation layer 154 covers the entire flat plate layer 1531, that is, the insulation layer 154 covers the entire waveguide layer 153.

Figure 5:
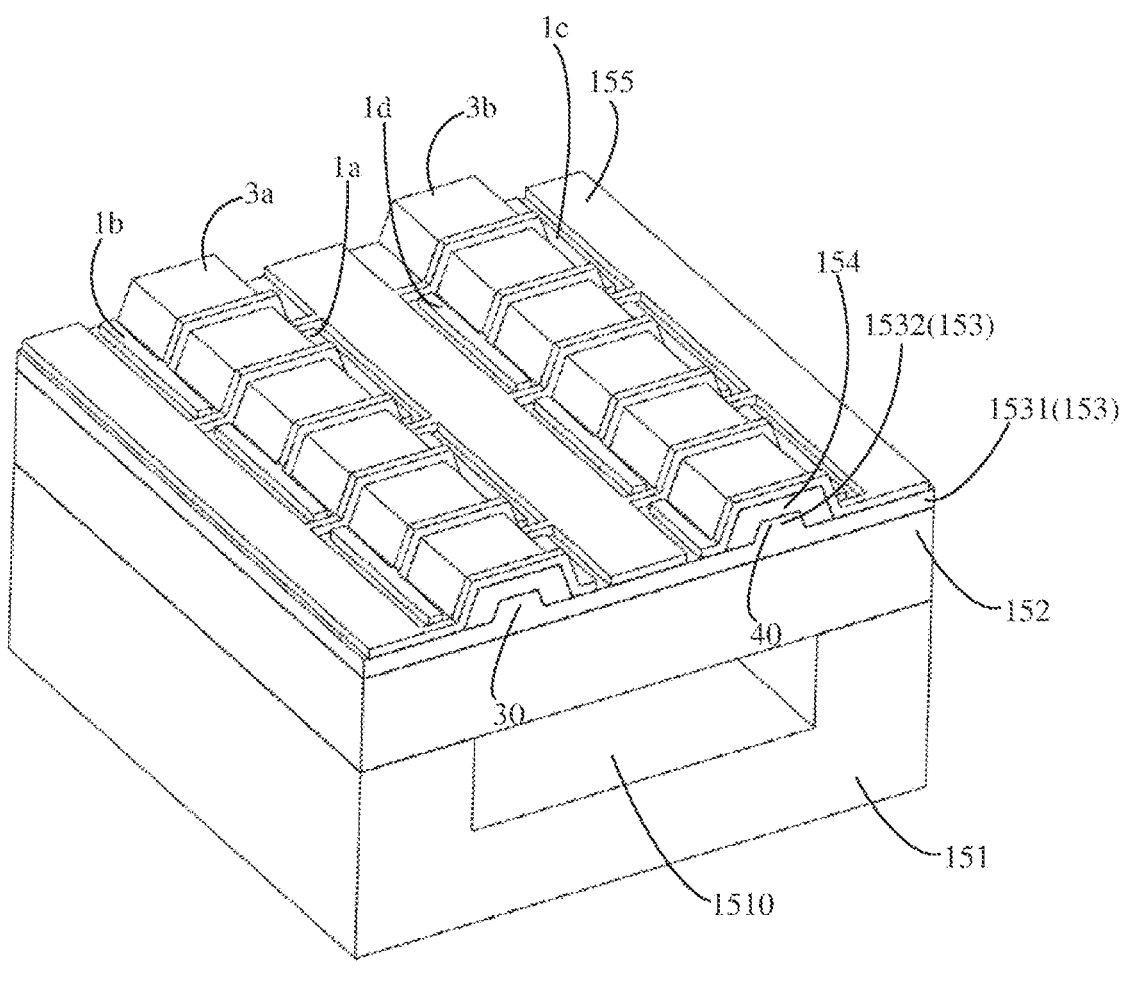
FIG. 5 is a perspective view of a partial structure of a folded electro-optic modulator according to some example embodiments of the present disclosure.
Figure 6:
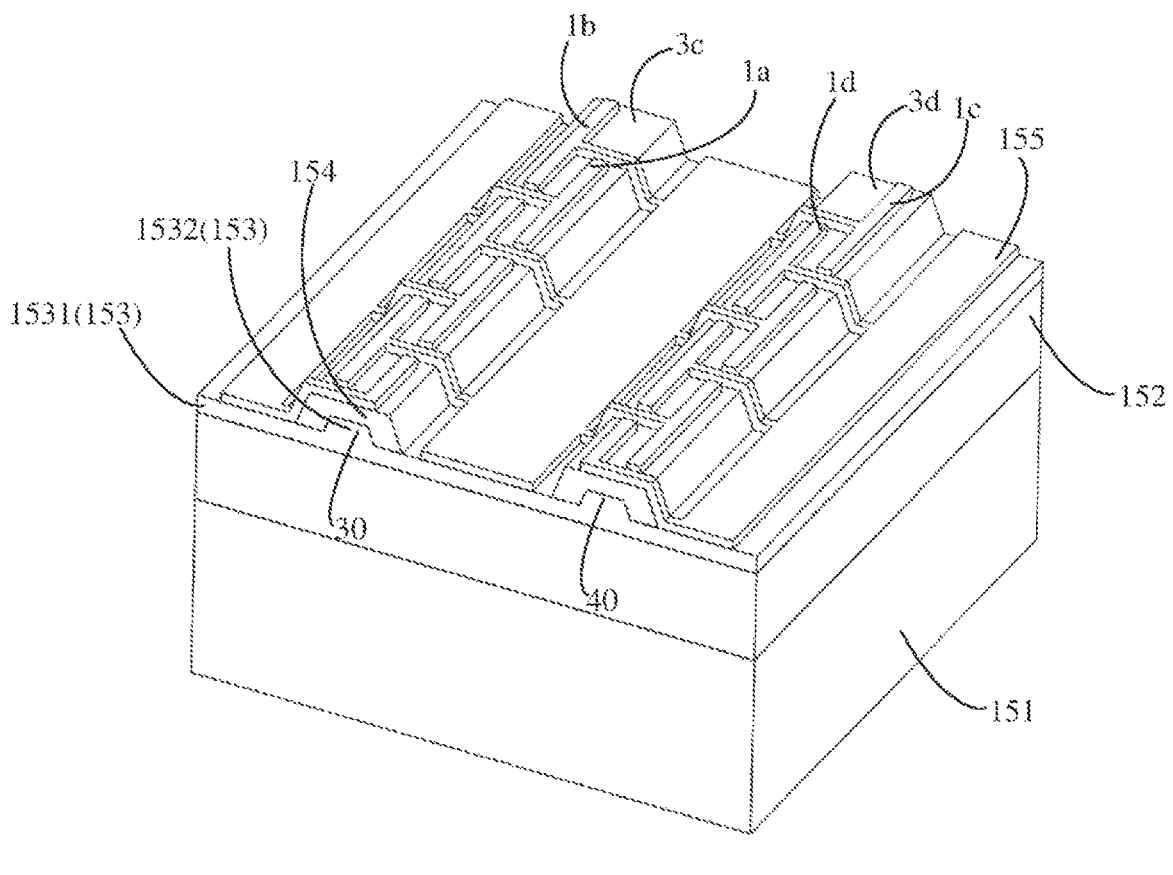
FIG. 6 is a perspective view of a partial structure of a folded electro-optic modulator according to some example embodiments of the present disclosure.

As shown in FIGS. 4 and 5, in some embodiments of the present disclosure, a protruding structure 3a formed by the portion of the insulation layer 154 that covers the first waveguide arm 30 is located between the first sub-electrodes 1a and the first main electrode 111 and between the second sub-electrodes 1b and the second main electrode 112, and a protruding structure 3b formed by the portion of the insulation layer 154 that covers the second waveguide arm 40 is located between the third sub-electrodes 1c and the second main electrode 112 and between the fourth sub-electrodes 1d and the third main electrode. That is, the connecting arms span the protruding structures of the insulation layer 154.

As shown in FIGS. 6, 7, 8, and 9, in some other embodiments of the present disclosure, the first sub-electrodes 1a and the second sub-electrodes 1b are formed on the surface of a protruding structure 3c formed on the portion of the insulation layer 154 that covers the first waveguide arm 30, and the third sub-electrodes 1c and the fourth sub-electrodes 1d are formed on the surface of a protruding structure 3d formed on the portion of the insulation layer 154 that covers the second waveguide arm 40. That is, the connecting arms do not completely span the protruding structures of the insulation layer 154.

Regardless of whether the connecting arms completely span the protruding structures of the insulation layer 154, the connecting arms are insulated from and intersect with the waveguide arms such that the sub-electrodes and the corresponding main electrode are respectively located on two sides of the waveguide arms, thereby ensuring the consistency of directions of the electric fields applied to the waveguide arms.

As shown in FIG. 3, in some embodiments of the present disclosure, the folded electro-optic modulator 100 further includes at least one of the following structures provided in at least one odd-ordered radio-frequency modulation region 10:

a plurality of fifth sub-electrodes 1e, each fifth sub-electrode 1e being located between the first main electrode 111 and the first waveguide arm 30 and connected to a side of the first main electrode 111 close to the first waveguide arm 30 by means of a fifth connecting arm 2e;

a plurality of sixth sub-electrodes 1f, each sixth sub-electrode 1f being located between the second main electrode 112 and the first waveguide arm 30 and connected to a side of the second main electrode 112 close to the first waveguide arm 30 by means of a sixth connecting arm 2f;

a plurality of seventh sub-electrodes 1g, each seventh sub-electrode 1g being located between the second main electrode 112 and the second waveguide arm 40 and connected to a side of the second main electrode 112 close to the second waveguide arm 40 by means of a seventh connecting arm 2g; and a plurality of eighth sub-electrodes 1h, each eighth sub-electrode 1h being located between the third main electrode 113 and the second waveguide arm 40 and connected to a side of the third main electrode 113 close to the second waveguide arm 40 by an eighth connecting arm 2h.

The fifth sub-electrodes 1e, the sixth sub-electrodes 1f, the seventh sub-electrodes 1g and the eighth sub-electrodes 1h may be selected and arranged as desired, and their numbers and shapes may also be selected and designed as desired. The selection and arrangement of these sub-electrodes can reduce the impedance mismatch that may exist in different regions of the folded electro-optic modulator 100 and reduce the microwave reflection of electrical signals, which is conducive to further improvement of the performance of device. In addition, since the speed of optical transmission is generally greater than that of electrical transmission, the design of these sub-electrodes can compensate for the difference in transmission speed of optical signals and electrical signals to a certain extent so as to match the transmission of optical field with the transmission of electric field as much as possible, thereby further improving the performance of device of the folded electro-optic modulator.

Figure 10:
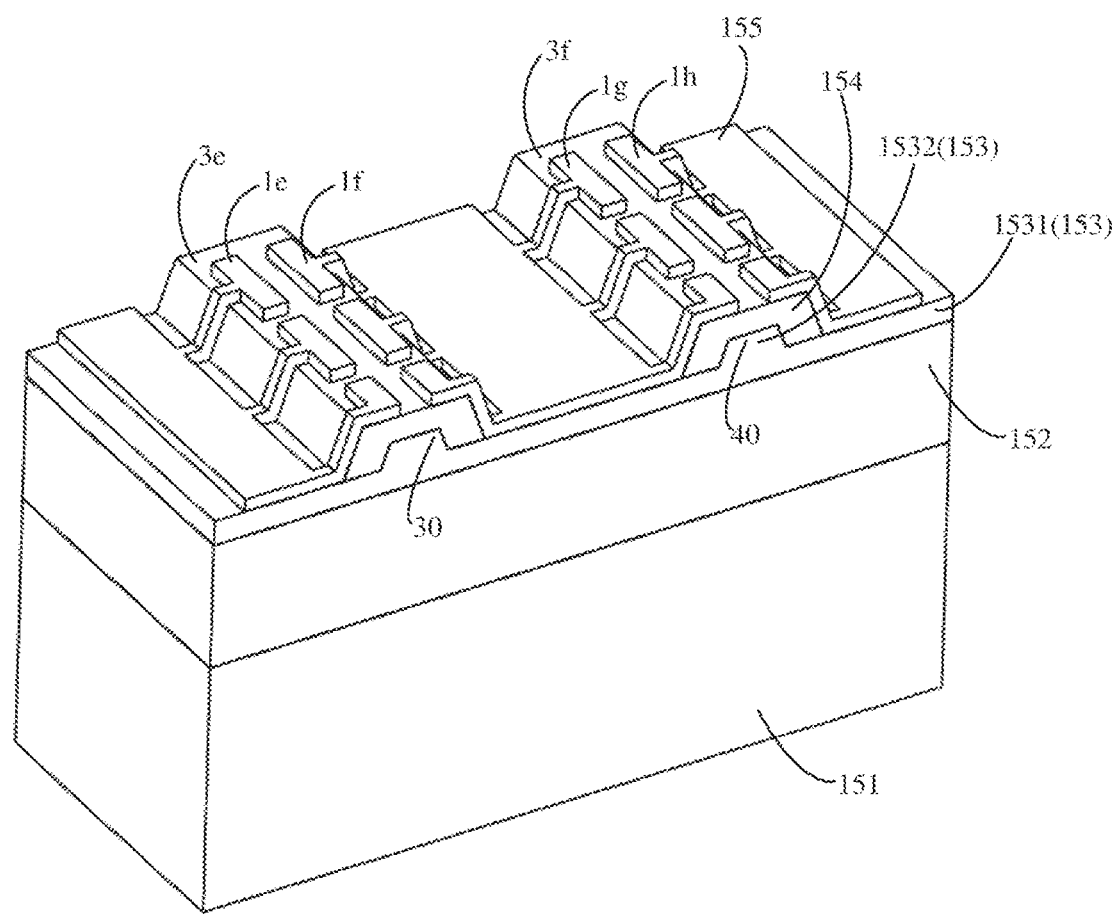
FIG. 10 is a perspective view of a partial structure of a folded electro-optic modulator according to some example embodiments of the present disclosure.

Similarly, as shown in FIG. 10, the fifth sub-electrodes 1e and the sixth sub-electrodes 1f may be arranged on the surface of a protruding structure 3e shown in the figure, and the seventh sub-electrodes 1g and the eighth sub-electrodes 1h may be arranged on the surface of a protruding structure 3f shown in the figure. In some other embodiments, the fifth sub-electrodes and the sixth sub-electrodes may also be arranged on two sides of the protruding structure, and the fifth connecting arms and the sixth connecting arms do not span the protruding structure; and the seventh sub-electrodes and the eighth sub-electrodes may also be arranged on the two sides of the protruding structure, and the seventh connecting arms and the eighth connecting arms do not span the protruding structure.

Figure 7:
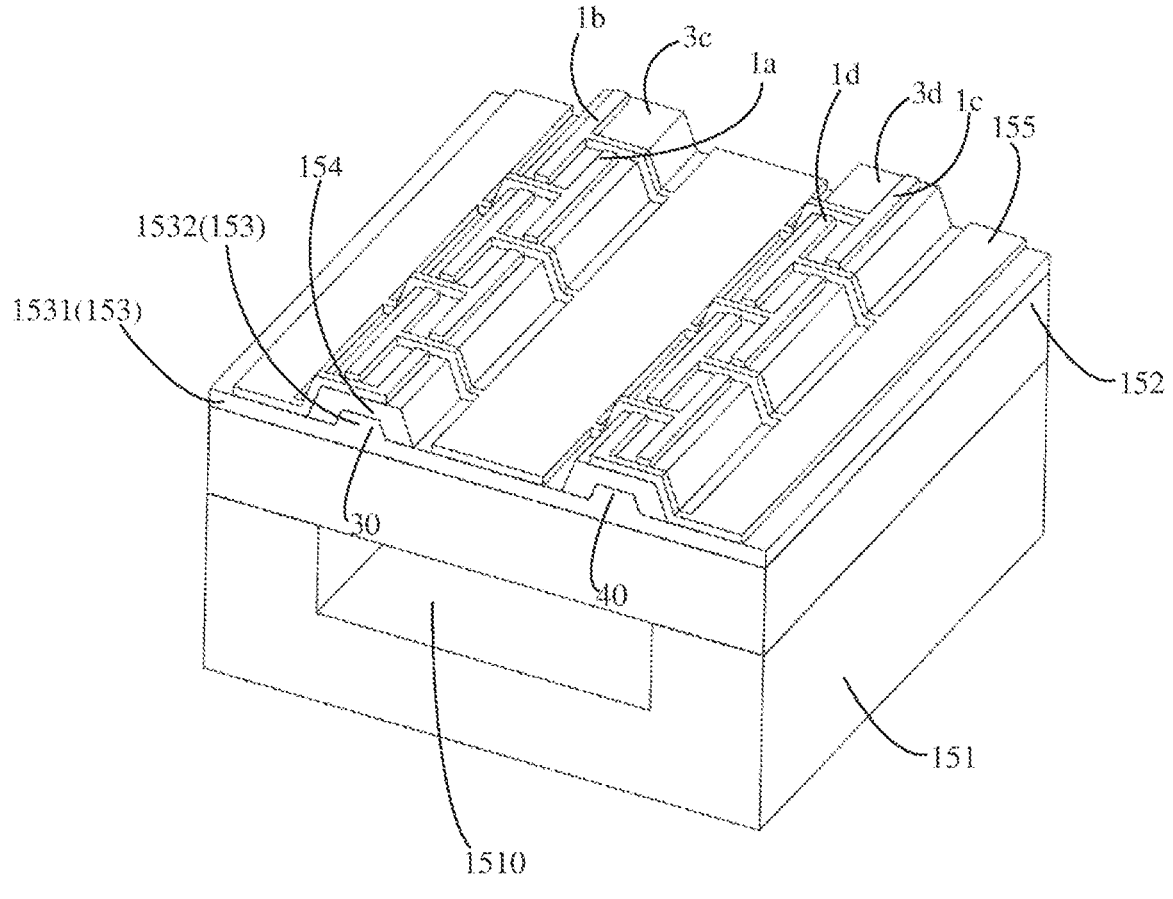
FIG. 7 is a perspective view of a partial structure of a folded electro-optic modulator according to some example embodiments of the present disclosure.

As shown in FIGS. 5, 7 and 8, in some embodiments of the present disclosure, the substrate 151 is provided with a recess structure 1510 facing toward the isolation layer 152.

Since the speed of optical transmission is generally greater than that of electrical transmission, in this embodiment, the recess structure 1510 on the substrate 151 can reduce the propagation constant of electrical signals to a certain extent and thus increase the transmission speed of electrical signals to compensate for the difference in transmission speed described above so as to match the transmission of the light field with the transmission of the electric field in the radio-frequency modulation region, thereby further improving the performance of device of the folded electro-optic modulator. In other embodiments of the present disclosure, the recess structure may also be designed to have other orientations according to actual needs, which will not be specifically defined in the present disclosure.

In some embodiments of the present disclosure, as shown in FIG. 3, the folded electro-optic modulator 100 further includes: a phase-compensation modulation module 70 arranged between the foregoing electrode structure and the optical-combining element 60. The phase-compensation modulation module 70 may modulate the first waveguide arm 30 and the second waveguide arm 40 as desired so as to compensate for the inherent phase difference between the two waveguide arms, thereby further improving the accuracy of the modulation output of the electro-optic modulator. The phase-compensation modulation module 70 is not limited to being arranged at the position described above, but may also be arranged between the optical-splitting element 50 and the foregoing electrode structure, for example.

The phase-compensation modulation module 70 is not limited to a specific type and may be, for example, an electro-optic phase-compensation modulation module based on the electro-optic effect, or a thermo-optic phase-compensation modulation module based on the thermo-optic effect. When the phase-compensation modulation module 70 is an electro-optic phase-compensation modulation module based on the electro-optic effect, some layer structures may be fabricated in the same layers as some of the layer structures of the folded electro-optic modulator described above to simplify the process and reduce the fabrication cost.

In some embodiments, it is also possible to provide no phase-compensation modulation module 70 as desired.

In summary, the folded electro-optic modulator 100 provided by the embodiments of the present disclosure can realize the miniaturization design of device while meeting the requirements for the performance of device, and accordingly is easier to be integrated in a hardware system.

It should be understood that, in this description, the orientations or positional relationships or dimensions denoted by the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential", are the orientations or positional relationships or dimensions shown on the basis of the accompanying drawings, and these terms are used merely for ease of description, rather than indicating or implying that the device or element referred to must have particular orientations and be constructed and operated in the particular orientations, and therefore should not be construed as limiting the scope of protection of the present disclosure.

In addition, the terms such as "first", "second" and "third" are merely for descriptive purposes and should not be construed as indicating or implying relative importance or implicitly indicating the number of technical features indicated. Thus, the features defined with "first", "second" and "third" may explicitly or implicitly include one or more features. In the description of the present disclosure, the term "a plurality of" means two or more, unless otherwise explicitly and specifically defined.

In the present disclosure, unless expressly stated or defined otherwise, the terms such as "mounting", "connection", "connected" and "fixing" should be interpreted broadly, for example, they may be a fixed connection, a detachable connection, or an integrated connection; may be mechanical connection, or electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or defined otherwise, the expression of the first feature being "above" or "below" the second feature may include the case that the first feature is in direct contact with the second feature, or the case that the first feature and the second feature are not in direct contact but are contacted via another feature therebetween. Furthermore, the first feature being "over", "above" or "on" the second feature includes the case that the first feature is directly or obliquely above the second feature, or merely indicates that the first feature is at a higher level than the second feature. The first feature being "below", "under" or "beneath" the second feature includes the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions. All these changes or substitutions shall fall within the scope of protection of the present disclosure. Therefore, the scope of protection of the present disclosure shall be subject to the scope of protection of the claims.

What is claimed is:

1. A folded electro-optic modulator, comprising:
a first waveguide arm and a second waveguide arm, which are in a folded form as a whole and do not intersect with each other;
a first main electrode, a second main electrode and a third main electrode, wherein the first main electrode, the second main electrode and the third main electrode are in a folded form as a whole and do not intersect with each other, and the first waveguide arm is located between the first main electrode and the second main electrode, and the second waveguide arm is located between the second main electrode and the third main electrode, and the first main electrode and the third main electrode are ground electrodes for radio-frequency signals, and the second main electrode is a signal electrode for the radio-frequency signals; and the following structures provided in each even-ordered radio-frequency modulation region of the folded electro-optic modulator in a transmission direction of the first waveguide arm and the second waveguide arm;

a plurality of first sub-electrodes, wherein each of the plurality of first sub-electrodes is connected to a side of the first main electrode close to the second main electrode by using a first connecting arm that is insulated from and intersects with the first waveguide arm;

a plurality of second sub-electrodes, wherein each of the plurality of second sub-electrodes is connected to a side of the second main electrode close to the first main electrode by using a second connecting arm that is insulated from and intersects with the first waveguide arm;

a plurality of third sub-electrodes, wherein each of the plurality of third sub-electrodes is connected to a side of the second main electrode close to the third main electrode by using a third connecting arm that is insulated from and intersects with the second waveguide arm; and a plurality of fourth sub-electrodes, wherein each of the plurality of fourth sub-electrodes is connected to a side of the third main electrode close to the second main electrode by using a fourth connecting arm that is insulated from and intersects with the second waveguide arm.

2. The folded electro-optic modulator according to claim 1, wherein each of the first sub-electrodes and the corresponding first connecting arm form a first T-shaped structure, each of the second sub-electrodes and the corresponding second connecting arm form a second T-shaped structure, and the plurality of first T-shaped structures and the plurality of second T-shaped structures are alternately arranged in an extension direction of the radio-frequency modulation region, with a gap between the adjacent first sub-electrodes being smaller than a length of the second sub-electrode, and a gap between the adjacent second sub-electrodes being smaller than a length of the first sub-electrode; and each of the third sub-electrodes and the corresponding third connecting arm form a third T-shaped structure, each of the fourth sub-electrodes and the corresponding fourth connecting arm form a fourth T-shaped structure, and the plurality of third T-shaped structures and the plurality of fourth T-shaped structures are alternately arranged in the extension direction of the radio-frequency modulation region, with a gap between the adjacent third sub-electrodes being smaller than a length of the fourth sub-electrode, and a gap between the adjacent fourth sub-electrodes being smaller than a length of the third sub-electrode.

3. The folded electro-optic modulator according to claim 1, wherein each of the first sub-electrodes and the corresponding first connecting arm form a first L-shaped structure, each of the second sub-electrodes and the corresponding second connecting arm form a second L-shaped structure, and the plurality of first L-shaped structures and the plurality of second L-shaped structures are alternately arranged in an extension direction of the radio-frequency modulation region, with an orthographic projection of each of the first sub-electrodes overlapping with an orthographic projection of one second sub-electrode in the extension direction of the radio-frequency modulation region; and each of the third sub-electrodes and the corresponding third connecting arm form a third L-shaped structure, each of the fourth sub-electrodes and the corresponding fourth connecting arm form a fourth L-shaped structure, and the plurality of third L-shaped structures and the plurality of fourth L-shaped structures are alternately arranged in the extension direction of the radio-frequency modulation region, with an orthographic projection of each of the third sub-electrodes overlapping with an orthographic projection of one fourth sub-electrode in the extension direction of the radio-frequency modulation region.

4. The folded electro-optic modulator according to claim 1, wherein the folded electro-optic modulator comprises a substrate, an isolation layer, a waveguide layer, an insulation layer and an electrode layer, wherein the substrate, the isolation layer, the waveguide layer, the insulation layer, and the electrode layer are arranged in sequence, wherein the first waveguide arm and the second waveguide arm are located in the waveguide layer;

the first main electrode, the second main electrode, the third main electrode, the first sub-electrodes, the first connecting arms, the second sub-electrodes, the second connecting arms, the third sub-electrodes, the third connecting arms, the fourth sub-electrodes and the fourth connecting arms are located in the electrode layer; and the first connecting arms and the second connecting arms are insulated from the first waveguide arm by using the insulation layer, and the third connecting arms and the fourth connecting arms are insulated from the second waveguide arm by using the insulation layer.

5. The folded electro-optic modulator according to claim 4, wherein the waveguide layer is a ridge raised pattern layer; or the waveguide layer is a ridge waveguide layer comprising a flat plate layer and a ridge raised pattern layer located on a side of the flat plate layer away from the substrate, and the first waveguide arm and the second waveguide arm are located in the ridge raised pattern layer.

6. The folded electro-optic modulator according to claim 4, wherein the waveguide layer is a ridge waveguide layer comprising a flat plate layer and a ridge raised pattern layer located on a side of the flat plate layer away from the substrate, and the first waveguide arm and the second waveguide arm are located in the ridge raised pattern layer; and the insulation layer covers the ridge raised pattern layer and exposes at least a part of region of the flat plate layer, and the first main electrode, the second main electrode and the third main electrode are formed on a surface of the flat plate layer exposed from the insulation layer; or the insulation layer covers the ridge raised pattern layer and covers at least a part of region of the flat plate layer, and the first main electrode, the second main electrode and the third main electrode are formed on a surface of a portion of the insulation layer that covers the flat plate layer.

7. The folded electro-optic modulator according to claim 4, wherein a protruding structure formed by a portion of the insulation layer that covers the first waveguide arm is located between the first sub-electrodes and the first main electrode and between the second sub-electrodes and the second main electrode; and a protruding structure formed by a portion of the insulation layer that covers the second waveguide arm is located between the third sub-electrodes and the second main electrode and between the fourth sub-electrodes and the third main electrode.

8. The folded electro-optic modulator according to claim 4, wherein the first sub-electrodes and the second sub-electrodes are formed on a surface of a protruding structure formed by a portion of the insulation layer that covers the first waveguide arm; and the third sub-electrodes and the fourth sub-electrodes are formed on a surface of the protruding structure formed by the portion of the insulation layer that covers the second waveguide arm.

9. The folded electro-optic modulator according to claim 8, wherein the substrate is provided with a recess structure.

10. The folded electro-optic modulator according to claim 1, further comprising at least one of the following structures provided in at least one odd-ordered radio-frequency modulation region of the folded electro-optic modulator:

a plurality of fifth sub-electrodes, wherein each of the plurality of fifth sub-electrodes is located between the first main electrode and the first waveguide arm and is connected to a side of the first main electrode close to the first waveguide arm by using a fifth connecting arm;

a plurality of sixth sub-electrodes, wherein each of the plurality of sixth sub-electrodes is located between the second main electrode and the first waveguide arm and is connected to a side of the second main electrode close to the first waveguide arm by using a sixth connecting arm;

a plurality of seventh sub-electrodes, wherein each of the plurality of seventh sub-electrodes is located between the second main electrode and the second waveguide arm and is connected to a side of the second main electrode close to the second waveguide arm by using a seventh connecting arm; and a plurality of eighth sub-electrodes, wherein each of the plurality of eighth sub-electrodes is located between the third main electrode and the second waveguide arm and is connected to a side of the third main electrode close to the second waveguide arm by using an eighth connecting arm.

* * * * *